J. HAUPT.
COMBINED CHOCOLATE DIPPING TABLE AND COOLER.
APPLICATION FILED JAN. 10, 1912.
1,053,033.
Patented Feb. 11, 1913.
3 SHEETS—SHEET 1.
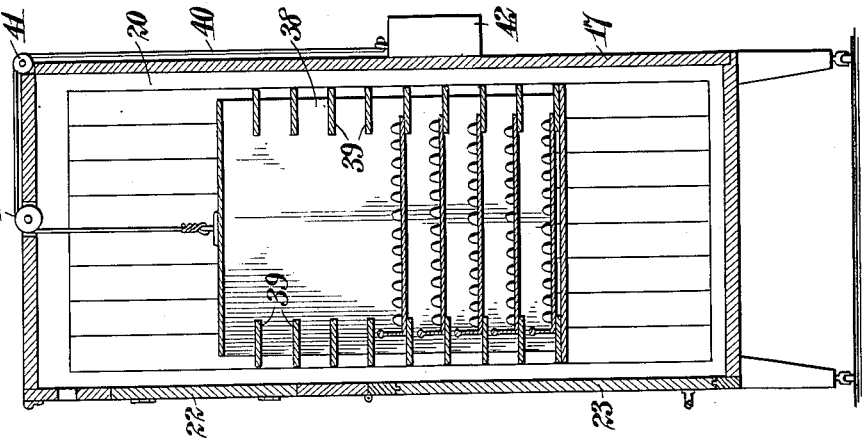
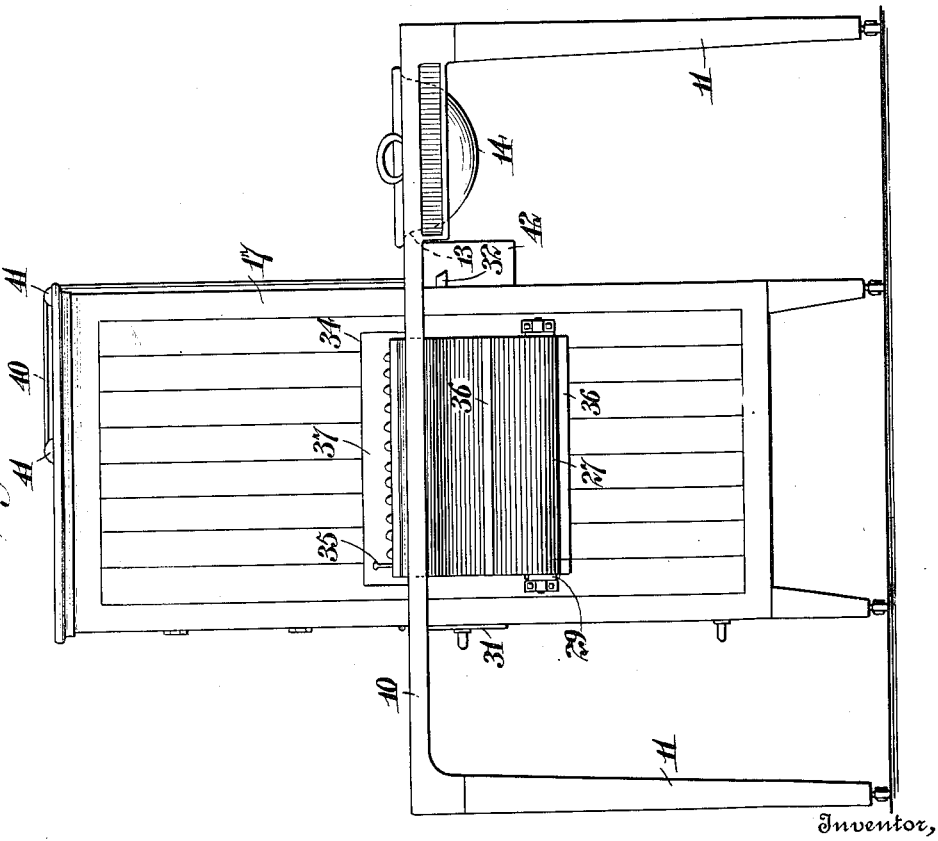
Inventor,
John Haupt.
Witnesses:
Christ Feinle, Jr.
By Victor J. Evans,
Attorney.

J. HAUPT.
COMBINED CHOCOLATE DIPPING TABLE AND COOLER.
APPLICATION FILED JAN. 10, 1912.
1,053,033.
Patented Feb. 11, 1913.
3 SHEETS—SHEET 2.
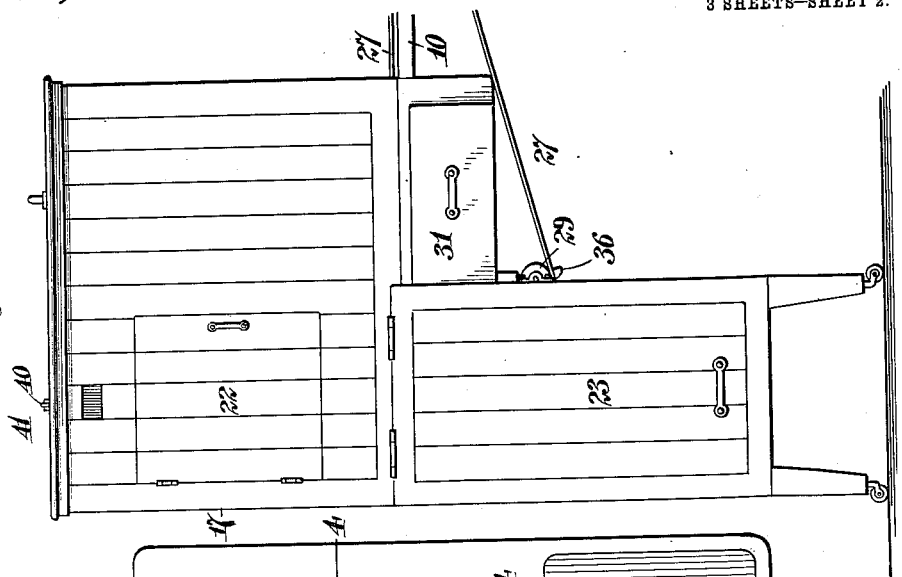
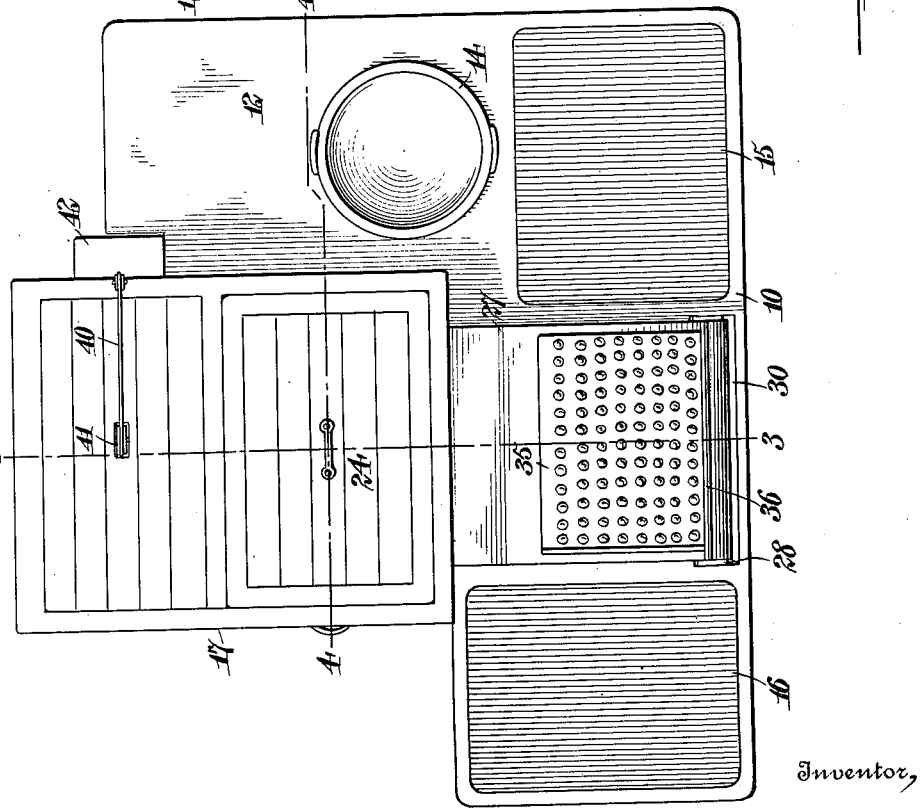

J. HAUPT.
COMBINED CHOCOLATE DIPPING TABLE AND COOLER.
APPLICATION FILED JAN. 10, 1912.
1,053,033.
Patented Feb. 11, 1913.
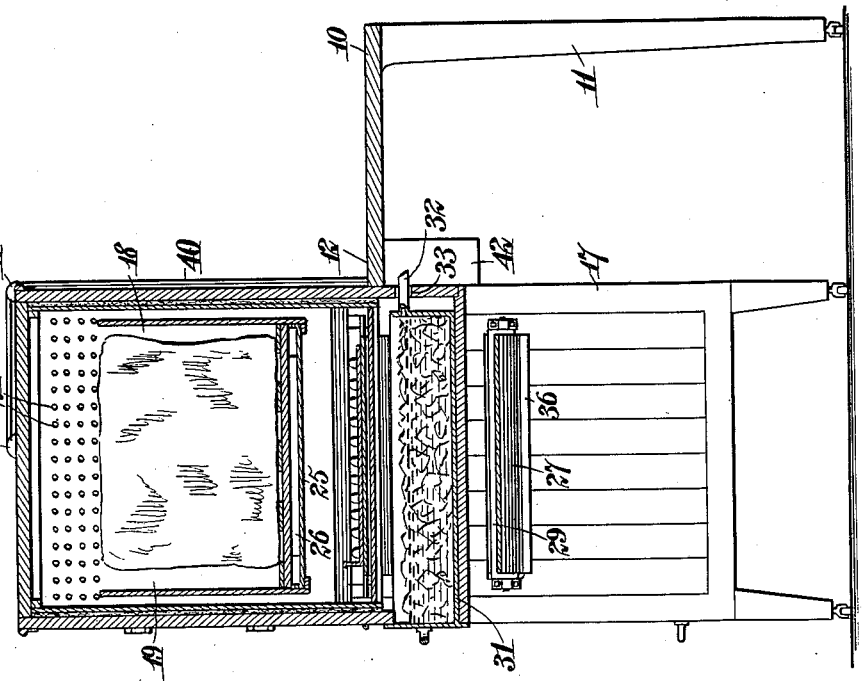
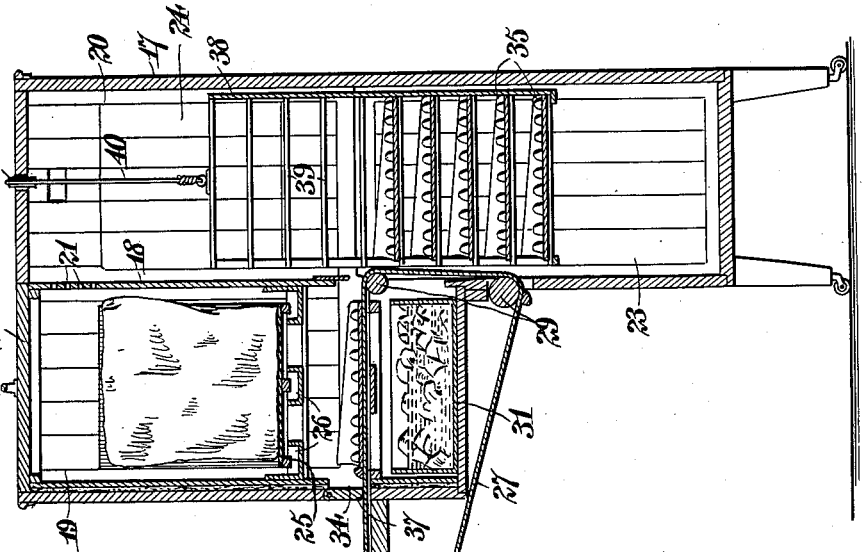
Inventor,
John Haupt.
By Victor J. Evans,
Attorney.
Witnesses:
Christ Feinle Jr.

UNITED STATES PATENT OFFICE.

JOHN HAUPT, OF ROCHESTER, NEW YORK.

COMBINED CHOCOLATE DIPPING TABLE AND COOLER.

1,053,033.   Specification of Letters Patent.   Patented Feb. 11, 1913.

Application filed January 10, 1912. Serial No. 670,475.

*To all whom it may concern:*

Be it known that I, JOHN HAUPT, a citizen of the United States, residing at Rochester, in the county of Monroe and State of New York, have invented new and useful Improvements in Combined Chocolate Dipping Tables and Coolers, of which the following is a specification.

The invention relates to a chocolate dipping table and cooler, and has for its primary object to provide an apparatus of this character in which candy cubes may be dipped in chocolate for the coating thereof, and introduced into a cooling chamber, whence they will be cooled for the hardening of the chocolate coating thereon.

Another object of the invention is the provision of an apparatus of this character in which a conveyer is arranged whereby a number of trays supporting candy cubes may be carried from the work table after the coating thereof with chocolate into an elevator, so that the same will be subjected to cold air for the cooling of the chocolate coating upon the candy cubes for the hardening of the same.

A further object of the invention is the provision of an apparatus of this character in which candy coated with chocolate will be subjected to a cooling fluid, such as air, the same circulating through a chamber or compartment for the hardening of the chocolate when the candy is fed thereinto, the trays for the candy being supported in an elevator movable within the said compartment or chamber which is provided with a suitable doorway, thereby permitting access thereto for the removal of the trays from the elevator, when the chocolate coating has become hardened.

A still further object of the invention is the provision of an apparatus of this character which is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a front elevation of an apparatus constructed in accordance with the invention. Fig. 2 is a top plan view thereof. Fig. 3 is a sectional view on the line 3—3 of Fig. 2. Fig. 4 is a sectional view on the line 4—4 of Fig. 2. Fig. 5 is a side elevation of the apparatus. Fig. 6 is a vertical transverse sectional view through the secondary cooling chamber or compartment and the elevator arranged therein.

Similar reference characters indicate corresponding parts throughout the several views of the drawings.

Referring to the drawings by numerals, the apparatus comprises a work table, including a top 10 supported upon legs 11, the top being formed with a rear extension 12, in which is provided an opening 13, receiving a removable chocolate pot or other receptacle 14, in which is adapted to be placed the hot chocolate in a liquid state, the pot or receptacle 14 being heated in any suitable manner. Disposed at one side of the center of the top 10 is a mixing slab 15, on which the candy cubes are formed prior to the dipping thereof into the chocolate contained in the pot or receptacle 14, while at the opposite side of the center of the said top 10 is a tray 16, in which are placed the candy cubes when ready to be dipped into the chocolate for the coating thereof.

Arranged at the rear of the table and fixed to the top 10 and its extension 12 is a cooling device, comprising a casing 17, the same being formed with a vertically disposed central partition 18, providing independent primary and secondary cooling chambers or compartments 19 and 20, the partition being formed, near its upper end, with a plurality of openings 21, thus establishing communication between the said compartments or chambers to permit a free circulation of cold air therein, the compartment 20 being of considerably greater length than the compartment 19, and in which is arranged an elevator, presently described.

In one side wall of the casing 17 and communicating with the said compartments 19 and 20 are suitable doorways, the same being closed by hinged doors 22 and 23, respectively, the door 22 swinging horizontally, while the door 23 swings vertically when being opened, and in this manner access may be had to the said compartments or chambers. Also the top of the casing 17 is provided with a removable lid 24, which, when raised, permits the introduction of ice into the compartment 19, the latter being formed with a suitable ice supporting rack 25, upon which is placed the ice when introduced thereinto. The inner wall of the compartment 19 is packed with heat insulating material in a manner similar to an ordinary refrigerator, so as to retain the cool air therein. The ice rack 25 is provided with suitable drain channels 26, which permit the drippings of the ice to be caught therein.

Arranged below the chamber or compartment 19 and spaced from the ice rack 26 therein is an endless conveyer, comprising a belt or apron 27, the same being trained over front and rear guide rollers 28 and 29, respectively, the front roller 28 being journaled in the table top 10, so as to lie within an elongated slot 30 formed therein. Thus, in this manner the upper stretch of the belt or apron 27 is extended over the central portion of the said table top 10, so that the trays carrying the candy cubes may be placed thereon, for a purpose presently described.

Arranged in the lower part of the compartment or chamber 19, below the upper stretch of the belt or apron 27, is an ice pan 31, the same being designed to catch the drippings from the drain channels or grooves 26 in the ice rack 25, and also in this pan 31 is placed cracked ice, so as to lower the temperature in the chamber 19 for the primary cooling of the candy cubes when passing through said chamber 19 into the secondary compartment 20 to be delivered to the elevator in the latter, the ice pan 31 being readily removable for the emptying or filling thereof, and is provided with an overflow spout 32, the spout being passed through a suitable opening 33 formed in one side wall of the chamber or compartment 19 to project exteriorly thereof, the overflow being caught in any suitable receptacle (not shown).

The front wall of the casing 17 is provided with a suitable inlet opening 34, which permits the entrance of the trays 35 when placed upon the apron or belt 27 into the compartment 19, the trays being prevented from displacement on the said belt or apron 27 by means of cross slats 36 fixed transversely to the said apron or belt, and these trays 35, after being passed through the compartment or chamber 19, are delivered into the compartment 20 upon an elevator, presently described.

The inlet opening 34 in the front wall of the casing 17 is adapted to be normally closed by means of a trip door 37 suitably hinged to the said front wall, so as to prevent the escape of cold air from the compartment 19, the trays 35 being designed to trip the door 37 to open position when entering the said compartment 19, and when each tray has fully passed within the latter the door will gravitate to closed position, thereby preventing the escape of cold air from the compartment.

The trays are designed to hold the candy cubes, after the same have been coated with chocolate, so that when the trays enter the compartment 19 the candy cubes will be subjected to the cold air for the cooling of the chocolate coating thereon.

The elevator located within the secondary cooling chamber 20 comprises a skeleton frame 38, in which are arranged spaced superposed horizontally arranged shelves 39, each of which is adapted to be brought into the plane of the upper stretch of the belt or apron 27 for receiving the trays 35, when the elevator frame is lowered in a step-by-step manner. Connected with the upper end of the elevator frame 38, centrally thereof, is a balancing weight cable 40, the same being trained over guide pulleys 41 mounted in the top of the casing 17 and carries at its opposite end a balancing weight 42, the elevator being normally raised to the uppermost portion of the chamber 20, and on the introduction of the trays 35 therein onto the shelves 39, the said trays will be manually manipulated to cause the lowering of the elevator frame 38 in a step-by-step manner, the elevator being held in adjusted position in any preferred way. In this manner the unoccupied shelves 39 will be successively brought into the plane of the upper stretch of the belt or apron 27 for receiving the next tray 35 thereon when entering the secondary cooling chamber 20 thereon. The coated chocolate cubes held within the trays 35, when positioned in the elevator, will be again subjected to cold air for the hardening of the chocolate on the cubes, and thereafter the trays may be conveniently removed from the chamber 20 on the opening of the door 23 thereof. The travel of the belt or apron 27 may be effected in any desirable manner, and also the dipping of the candy cubes may be either done by hand or with a fork, in the ordinary well-known manner.

What is claimed is:

1. An apparatus of the class described, comprising a work table, a cooling casing mounted on the table and having primary and secondary cooling chambers therein, means for supporting a refrigerant in the primary cooling chamber, an elevator arranged within the secondary cooling chamber and movable throughout the length thereof, and an endless conveyer working through the primary chamber and over the center of said table for introducing trays into the primary chamber and delivering the same into the elevator.

2. An apparatus of the class described, comprising a work table, a cooling casing mounted on the table and having primary and secondary cooling chambers therein, means for supporting a refrigerant in the primary cooling chamber, an elevator arranged within the secondary cooling chamber and movable throughout the length thereof, an endless conveyer working through the primary chamber and over the center of said table for introducing trays into the primary chamber and delivering the same into the elevator, and means on the conveyer for preventing the slipping of said trays when being conveyed thereby.

3. An apparatus of the class described, comprising a work table, a cooling casing mounted on the table and having primary and secondary cooling chambers therein, an elevator arranged within the secondary cooling chamber and movable throughout the length thereof, an endless conveyer working through the primary chamber and over the center of said table for introducing trays into the primary chamber and delivering the same into the elevator, means on the conveyer for preventing the slipping of said trays when being conveyed thereby, and an ice pan located within the primary chamber below the said conveyer.

4. An apparatus of the class described, comprising a work table, a cooling casing mounted on the table and having primary and secondary cooling chambers therein, an elevator arranged within the secondary cooling chamber and movable throughout the length thereof, an endless conveyer working through the primary chamber and over the center of said table for introducing trays into the primary chamber and delivering the same into the elevator, means on the conveyer for preventing the slipping of said trays when being conveyed thereby, an ice pan located within the primary chamber below the said conveyer, and a trip door normally closed for preventing the escape of cold air from the primary chamber and adapted to be opened when said trays upon the conveyer contact therewith.

5. An apparatus of the class described, comprising a work table, a cooling casing mounted on the table and having primary and secondary cooling chambers therein, an elevator arranged within the secondary cooling chamber and movable throughout the length thereof, an endless conveyer working through the primary chamber and over the center of said table for introducing trays into the primary chamber and delivering the same into the elevator, means on the conveyer for preventing the slipping of said trays when being conveyed thereby, an ice pan located within the primary chamber below the said conveyer, a trip door normally closed for preventing the escape of cold air from the primary chamber and adapted to be opened when said trays upon the conveyer contact therewith, and means permitting access to the primary and secondary chambers.

In testimony whereof I affix my signature in presence of two witnesses.

JOHN HAUPT.

Witnesses:
 GEO. F. BARTHOLOMEW,
 EARL T. BOGART.